United States Patent
Hyogo et al.

[11] Patent Number: 6,154,005
[45] Date of Patent: Nov. 28, 2000

[54] INDUCTIVE CHARGER COUPLING FOR ELECTRIC VEHICLES

[75] Inventors: Takashi Hyogo; Masahiko Terazoe; Masanori Tsuzuki, all of Kariya, Japan

[73] Assignee: Kabushiki Kaisha Toyoda Jidoshokki Seisakusho, Kariya, Japan

[21] Appl. No.: 09/270,948

[22] Filed: Mar. 17, 1999

[30] Foreign Application Priority Data

Mar. 20, 1998 [JP] Japan ................................. 10-072416

[51] Int. Cl.[7] .................................................. H02J 7/00
[52] U.S. Cl. .......................................... 320/108; 320/109
[58] Field of Search ..................................... 320/108, 109

[56] References Cited

U.S. PATENT DOCUMENTS

| | | | |
|---|---|---|---|
| 4,082,097 | 4/1978 | Mann et al. ............................. | 320/108 |
| 4,932,420 | 6/1990 | Goldstein ................................. | 607/156 |
| 5,311,973 | 5/1994 | Tseng et al. ............................. | 191/10 |
| 5,317,502 | 5/1994 | Rieffel ..................................... | 700/56 |
| 5,563,491 | 10/1996 | Tseng ...................................... | 320/109 |
| 5,703,462 | 12/1997 | Woody et al. ........................... | 320/109 |
| 5,821,728 | 10/1998 | Schwind .................................. | 320/108 |
| 5,889,384 | 3/1999 | Hayes et al. ............................. | 320/108 |
| 5,982,139 | 11/1999 | Parise ...................................... | 320/109 |

FOREIGN PATENT DOCUMENTS 7-39077  2/1995  Japan .

*Primary Examiner*—Peter S. Wong
*Assistant Examiner*—Pia Tibbits
*Attorney, Agent, or Firm*—Morgan & Finnegan, L.L.P.

[57] ABSTRACT

An inductive charger coupling for charging batteries of electric vehicles which includes a paddle having a circuit board comprising a communication circuit for receiving electrical signals regarding the battery charging state, and an antenna formed as a conductive print pattern on the paddle circuit board; the communication circuit converts radio signals received by the antenna into electrical signals; the receptacle receiving the paddle during charging includes a communication circuit and an antenna formed as a conductive print pattern on the receptacle circuit board.

13 Claims, 4 Drawing Sheets

INDUCTIVE CHARGER COUPLING FOR ELECTRIC VEHICLES

BACKGROUND OF THE INVENTION

The present invention relates to an inductive charger coupling for charging batteries of electric vehicles.

Battery-powered electric vehicles use a charger for charging their batteries. In recent years, chargers tend to have high voltage to lower the energy loss of the wiring. Electric vehicles are often used in rainy and dusty environments, and it is desirable that chargers that endure such environment be safe. In inductive chargers, a battery is charged from an external power source using electromagnetic induction. Inductive chargers ensure charging under rainy and dusty environment since they use electromagnetic induction. Accordingly, inductive chargers are suitable for electric vehicles.

Inductive chargers have a coupling including a charging paddle for supplying power and a receptacle for receiving power. The charging paddle is connected to an external power source. The receptacle is connected to a battery of an electric vehicle. Battery charging is performed by electromagnetic induction with the paddle and the receptacle close to one another, but not contacting.

For example, Japanese Unexamined Publication No. 7-39077 describes an inductive charger having a communication device using light for communication between a charging side and a charged side. The charged side has a transmitter and the charging side has a receiver. The communication device sends information such as a signal indicating completion of charging from the charged side to the charging side. The supply of electric current from the external power source is stopped based on the information. This prevents useless supply of current from the external power supply after the battery is completely charged. Accordingly, the external power supply does not waste power.

Generally, the reliability of the optical communication device is degraded by sunlight and dust. Light and dust do not affect the reliability of radio wave communication. However, radio waves lack directivity and are transmitted in a wide range, and this may cause jamming. For example, when charging at the charging station, there might be interference from other inductive chargers, or the radio waves from the communication device of the charger may interfere with televisions or FM radios.

To avoid jamming, it is necessary to use high frequency radio waves. However, to receive a high frequency radio waves, it is necessary to connect the communication circuit to an antenna using a coaxial cable. In this case, the communication device is complex and large, and so is the charger. Further, the receptacle needs a cover for sealing out water and dust. This further enlarges the size of the receptacle.

In electric vehicles, installed equipment should be compact and lightweight. Therefore, a large-size receptacle on any part of the electric vehicle results in a poor design.

SUMMARY OF THE INVENTION

The objective of the present invention is to provide an inductive charger having a compact and lightweight communication device.

To achieve the above objective, the present invention provides an inductive charger coupling for charging a battery using electromagnetic induction, which has the following structure. A charging paddle includes a primary core, a primary coil and a paddle communication circuit for receiving information representing the charging state of the battery. The primary coil is connected to a power source and wound around the primary core. The paddle circuit board includes a paddle antenna and the paddle communication circuit. The paddle antenna is connected to the paddle communication circuit. The paddle antenna is a conductive print pattern formed on the paddle circuit board. A receptacle, in which the paddle is received, delivers power to the battery. The receptacle includes a secondary core, a secondary coil, a receptacle circuit board and a receptacle communication circuit for transmitting the information. The secondary coil is electrically connected to the battery and wound around the secondary core. The receptacle circuit board includes a receptacle antenna and the receptacle communication circuit. The receptacle antenna is connected to the receptacle communication circuit. The receptacle antenna is a conductive print pattern formed on the receptacle circuit board.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention will now be described in reference to FIGS. 1–3.

Figure 1:
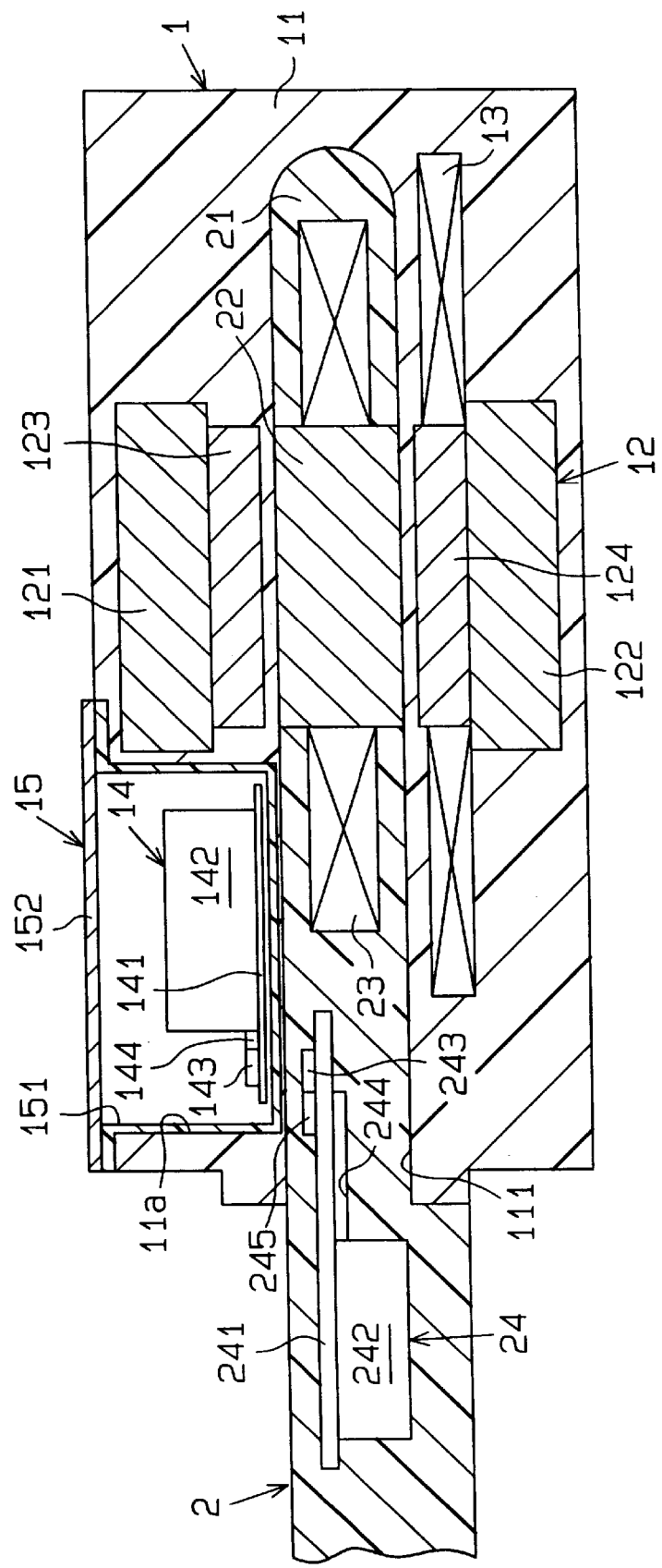
FIG. 1 is a cross-section of an inductive charger coupling according to a first embodiment of the present invention, with a charging paddle plugged in a receptacle.
Figure 2:
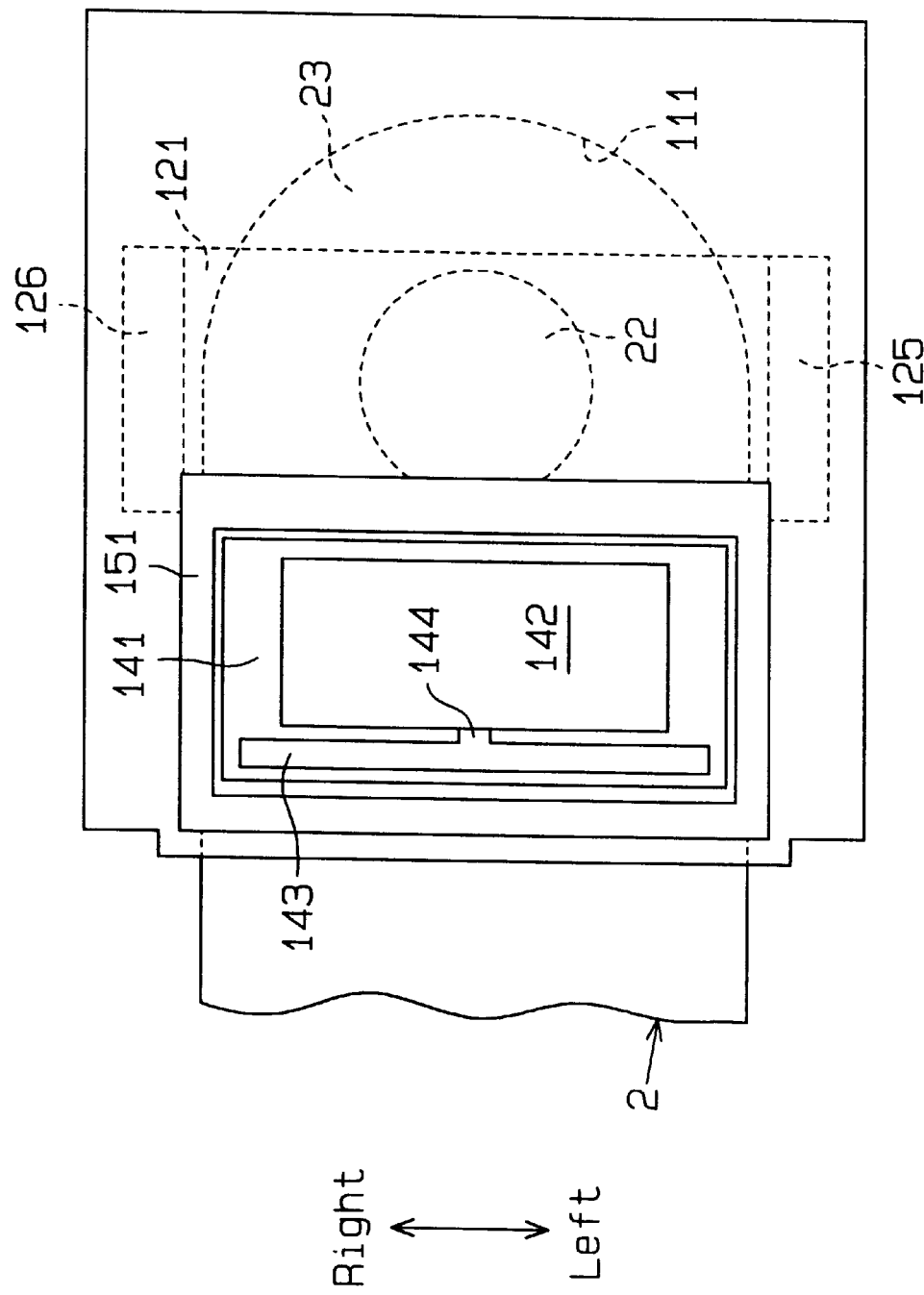
FIG. 2 is a plan view of the inductive charger of FIG. 1.

As shown in FIGS. 1 and 2, an inductive charger of the first embodiment includes a receptacle 1 and a charging paddle 2, which is generally planar. The receptacle 1 is installed on an electric vehicle (not shown). The receptacle 1 is covered with a layer of resin or a waterproof case and has a housing 11. The housing 11 accommodates a secondary core 12 and a secondary coil 13. The housing 11 includes a recess 11a on its upper surface. A case 15 is installed on the recess 11a. The housing 11 also includes a slot 111 for inserting the charging paddle 2.

The secondary core 12 has a closed structure. The secondary core 12 includes a left pillar 125, a right pillar 126, upper and lower lateral bridges 121, 122, and upper and lower supports 123, 124. The upper bridge 121 connects the upper ends of the pillars 125, 126. The lower bridge 122 connects the lower ends of the pillars 125, 126. The upper and lower bridges 121, 122, and the right and left pillars 125, 126 have predetermined dimensions to generate a required magnetic flux. The supports 123, 124 are columnar. The upper and lower supports 123, 124 are respectively located at the centers of the upper and lower bridges 121, 122 and face one another. A secondary coil 13 is wound around the lower support 124. The secondary coil 13 is electrically connected to a battery of an electric vehicle (not shown). When the charging paddle 2 is plugged in the receptacle 1, the secondary core 12 surrounds the distal end of the paddle 2.

The case 15 includes a rectangular resin box 151 and a lid 152. The case 15, which is waterproof and dust-proof, accommodates a receptacle communication device 14. The receptacle communication device 14 includes a circuit board 141 and a communication IC 142, which is mounted on the circuit board 141. An antenna 143 and a connecting line 144 are printed as conductive patterns on the circuit board 141. The connecting line 144 connects the antenna 143 and the communication IC 142. The conductive patterns are formed by etching a copper foil, which is attached to a ceramic board of the circuit board 141. The antenna 143 can be formed in any shape as long as it can be formed on the circuit board 141.

The charging paddle 2 is made of resin and its distal end is semi-circular as shown in FIG. 2. A primary core 22, a primary coil 23 and a paddle communication device 24 are embedded in the charging paddle 2. The primary coil 23 is electrically connected to an external power source (not shown). When the paddle 2 is completely inserted in the slot 111, the primary core 22 is placed between the supports 123, 124. In this state, the primary core 22 faces the secondary core 12.

The paddle communication device 24 includes a paddle circuit board 241 and a paddle communication IC 241. The paddle communication IC 242 is attached to the circuit board 241. The circuit board 241 includes an antenna 243 and connecting lines 244, 245 that connect the antenna 243 to the communication IC 242. The antenna 243 and the connecting line 244 are conductive patterns printed on the circuit board 241. The print pattern of the antenna 243 is strip-shaped. The conductive pattern is formed by etching a copper foil, which is attached to a ceramic board of the circuit board 241. The connecting lines 244, 255 are connected to one another by a conductor embedded in a via hole (not shown). The circuit board 241 may be either a resin board or a ceramic board. The conductive patterns may be formed either by printing with conductive paste or by etching copper foil. The shape of the antenna 243 is not limited as long as it can be formed on the circuit board 241. When the charging paddle 2 is completely inserted in the slot 111, the antennas 143, 243 are in close proximity to one another, face one another and are parallel.

The communication between the communication ICs 142, 242 is performed using a carrier frequency 300 MHz FM type radio wave. The carrier frequency and modulation type can be varied.

Figure 3:
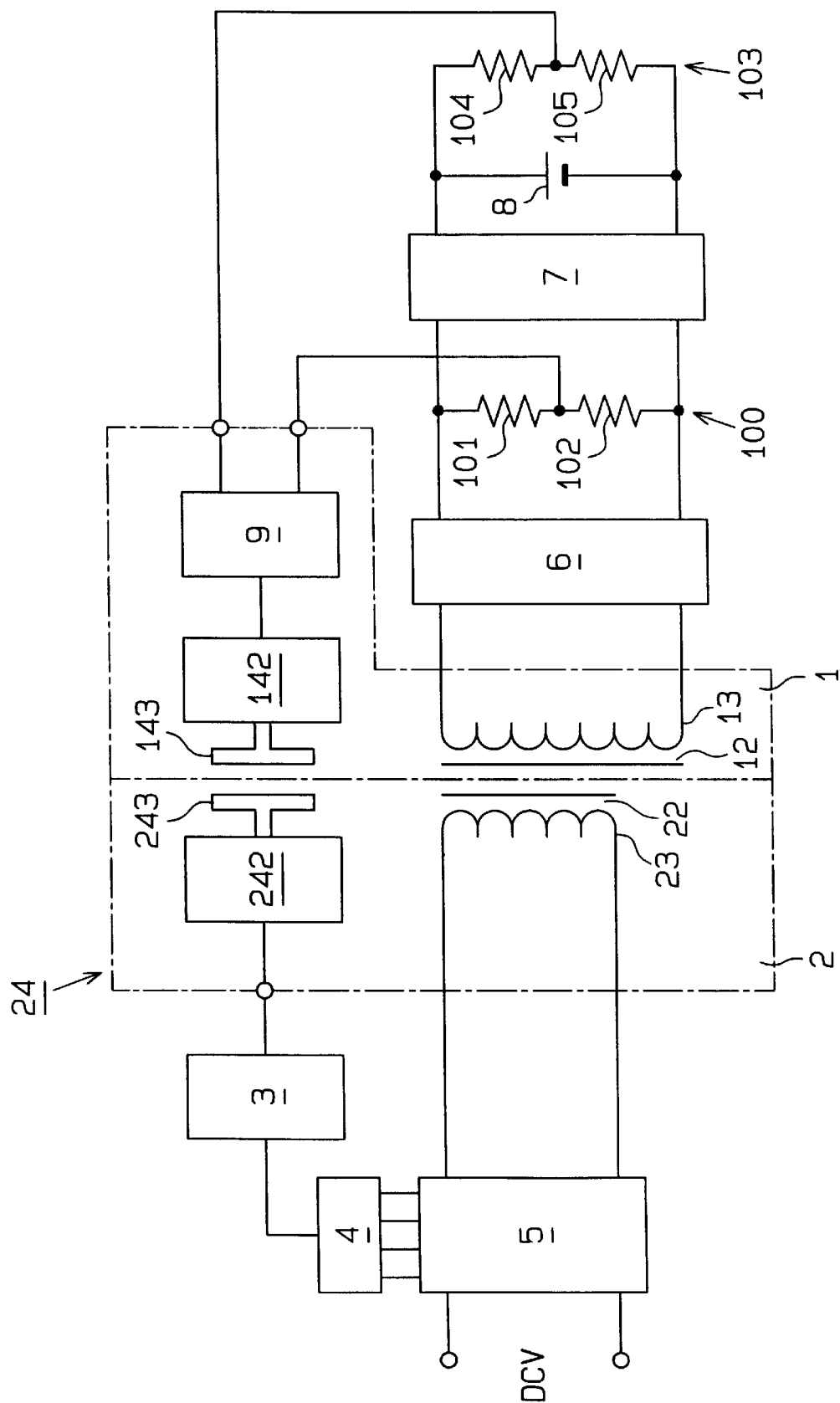
FIG. 3 is an electrical circuit of the inductive charger of FIG. 1.

An electric circuit diagram representing the inductive charger coupling according to the first embodiment is shown in FIG. 3. The antenna 243 is connected to a paddle controller 3 via the communication IC 242. The paddle controller 3 is connected to a gate controller 4. The gate controller 4 is connected to an inverter 5. The paddle controller 3 controls the inverter 5 through the gate controller 4 based on signals from the communication IC 242. The inverter 5 is a single-phase inverter having a normal H-shaped bridge structure. The bridge structure includes four IGBTs (Insulated Gate Bipolar Transistors). The inverter 5 converts a direct current voltage, which is obtained by rectifying power from an alternating power source (not shown), into an alternating voltage, which has a frequency of tens of kilohertz (kHz). The converted alternating voltage is induced to the secondary coil 13 from the primary coil 23 by electromagnetic induction. Then, on the receptacle side, the alternating voltage is rectified in a rectifier circuit 6, which is connected to the secondary coil 6. After being smoothed in a smoothing circuit 7, the voltage is used to charge a battery 8.

A first voltage-divider circuit 100 includes high-resistance resistors 101, 102, which are serially connected. The first voltage-divider circuit 100 divides the voltage output from the rectifier circuit 6 and inputs it into a receptacle controller 9. A second voltage-divider circuit 103 includes high-resistance resistors 104, 105, which are serially connected. The second voltage-divider circuit 103 divides the battery voltage and inputs it into the receptacle controller 9.

When the receptacle controller 9 receives high level output from the first voltage-divider circuit 100, the receptacle controller 9 instructs the communication IC 142 to send information about the start of charging and battery voltage value to the paddle controller 3. The battery voltage value is obtained by A/D converting the output from the first voltage-divider circuit 100. The information is transmitted to the paddle communication device 24 by radio wave communication from the receptacle antenna 143 to the paddle antenna 243. In the paddle communication device 24, the received radio wave is converted into the original information by the communication IC 242. The paddle controller 3 monitors the voltage of the battery 8 based on the information. The paddle controller 3 supplies the most suitable electric current to the primary coil 23 for charging, in accordance with the detected voltage of the battery 8. As a result, the battery 8 is charged without waste.

The first embodiment of the present invention will have the following advantages.

In the communication device, the antenna and the connecting line are formed as conductive patterns on the circuit board of the communication circuit. This reduces the size and weight of the communication device. As a result, the size and weight of the coupling is also reduced. Accordingly, costs are lowered since manufacturing material is reduced.

Further, there is no need to connect the antenna and the communication circuit by coaxial cable when performing high-frequency wireless communication.

Since the length of the connecting line connecting the communication circuit and the antenna is shortened, attenuation of signals is reduced.

The antenna and the connecting line for connecting the antenna and the communication circuit are manufactured at the same time that the circuit board for the communication circuit is manufactured. This shortens manufacturing process and reduces the number of parts.

Further, in the first embodiment, the receptacle communication device is small, and a large increase of volume of the receptacle is thus avoided.

In the first embodiment, when the charging paddle 2 is inserted in the receptacle 1, the antenna 143 and the antenna 243 are arranged close to and parallel with one another. This ensures good communication between the antennas 143, 243. Also, communication between the antennas 143, 243 requires very little transmitting power. Accordingly, the radio waves are less likely to interfere with other receivers.

Figure 4:
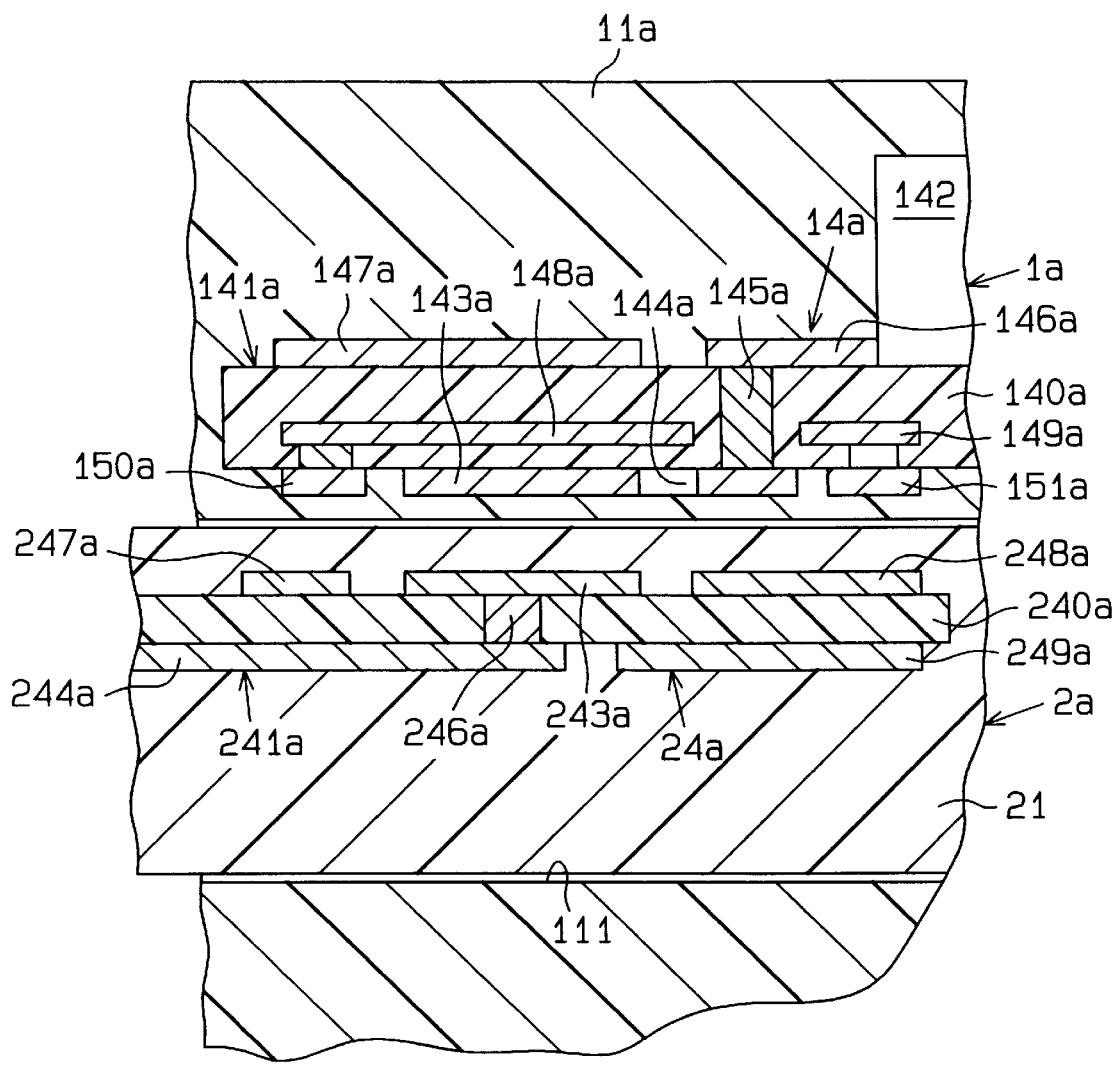
FIG. 4 is an enlarged cross-section showing a communication device of a paddle and a receptacle of an inductive charger according to a secondary embodiment of the present invention.

A second embodiment of the present invention will now be described with reference to FIG. 4. In the second embodiment, the receptacle communication device and the paddle communication device are different from those of the first embodiment.

The receptacle communication device 14a is embedded in the housing 11a. The circuit board 141a, on which the receptacle communication IC 142 is mounted, includes three layers of conductors (upper, middle, and lower conductors) on alumina board 140a. The lower conductor includes an antenna 143a, a connecting line 144a, and lower fences 150a, 151a. The upper conductor includes a connecting line 146a and an upper fence 147a. The middle conductor includes middle fences 148a, 149a. A conductor 145a, which is embedded in a via hole, connects the connecting lines 144a and 146a. The fences 147a, 148a, 149a, 150a, and 151a surround the antenna 143a and are grounded. Accordingly, the antenna 143a is shielded against electromagnetic interference in all directions except for its downward direction. That is, the surface of the antenna 143a that faces a paddle 2a is unshielded.

A circuit board 241a is embedded in the charging paddle 2a. A circuit board 241a, on which the paddle communication IC 242 is attached, includes two layers of conductors (upper and lower conductors) on the alumina board 240a. The upper conductor includes an antenna 243a and upper fences 247a, 248a. The lower conductor includes a connecting line 246a and a lower fence 249a. A conductor 246a, which is embedded in a via hole, connects the antenna 243a and the connecting line 244a. The fences 247a, 248a and 249a surround the antenna 243a and are grounded. Therefore, the antenna 243a is shielded against electromagnetic interference in all directions except for its upward direction. That is, the surface of the paddle antenna 243a that faces the other antenna 143a is unshielded.

The second embodiment has the following advantages in addition to the advantages of the first embodiment.

Since the antennas 143a, 243a are formed on the surfaces of the alumina boards 140a, 240a, which are close to one another, the distance between the antennas 143a, 243a is shorter than that of the first embodiment. Therefore, the receiving sensitivity is improved.

The antennas 143a, 243a are shielded against electromagnetic interference by conductive fences. This reduces interference by radio wave from outside and reduces leakage of radio waves.

In the first and the secondary embodiments, the paddle communication device is provided in the charging paddle. However, except for the antenna, all parts of the paddle communication device may be located in the proximal portion of the paddle.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An inductive charger coupling for charging a battery using electromagnetic induction, the coupling comprising:

a charging paddle, wherein the paddle includes a primary core, a primary coil and a paddle communication circuit for receiving information representing the charging state of the battery, the primary coil being connected to a power source and wound around the primary core, wherein the paddle circuit board includes a paddle antenna and the paddle communication circuit, the paddle antenna being connected to the paddle communication circuit, wherein the paddle antenna is a conductive print pattern formed on the paddle circuit board; and a receptacle, in which the paddle is received, for delivering power to the battery, wherein the receptacle includes a secondary core, a secondary coil, a receptacle circuit board and a receptacle communication circuit for transmitting the information, the secondary coil being electrically connected to the battery and wound around the secondary core, wherein the receptacle circuit board includes a receptacle antenna and the receptacle communication circuit, the receptacle antenna being connected to the receptacle communication circuit by a connecting line made of a conductive print pattern formed on the receptacle circuit board, wherein the receptacle antenna is a conductive print pattern formed on the receptacle circuit board.

2. The inductive charger coupling according to claim 1, wherein the receptacle antenna is arranged in close proximity to the paddle circuit board when the paddle is plugged in.

3. The inductive charger coupling according to claim 2, wherein the receptacle antenna is parallel with the paddle antenna when the paddle is plugged in.

4. The inductive charger coupling according to claim 3, wherein the receptacle antenna, except for a side facing the paddle circuit board, is shielded by conductive patterns formed on the receptacle circuit board.

5. The inductive charger coupling according to claim 2, further including a connecting line made of a conductive print pattern formed on the paddle circuit board, wherein the paddle antenna and the paddle communication circuit are connected by the connecting line.

6. The inductive charger coupling according to claim 1, wherein the receptacle circuit board and the paddle circuit board are waterproof and dust-proof.

7. The inductive charger coupling according to claim 6, wherein the receptacle is installed in a vehicle and the coupling is used for charging the vehicle battery.

8. An inductive charger coupling for charging a battery using electromagnetic induction, the coupling comprising:

a charging paddle, wherein the paddle includes a primary core, a primary coil, and a receiving circuit board, wherein the primary coil is wound around the primary core and is connected to a power source, wherein the receiving circuit board includes a paddle antenna and a receiving circuit, wherein the paddle antenna is connected to the receiving circuit, wherein the receiving circuit converts radio waves received by the paddle antenna into information concerning the battery charging state; and a receptacle, in which the paddle is received, for delivering power to the battery, wherein the receptacle includes a secondary core, a secondary coil, a transmitting circuit board for transmitting the information using radio waves, the secondary coil being electrically connected to the battery and wound around the secondary core, wherein the receiving circuit board includes a receptacle antenna and a transmitting circuit, the receptacle antenna being connected to the transmitting circuit by a connecting line made of conductive print pattern formed on the transmitting circuit board, wherein the transmitting circuit converts the information into radio waves, the radio waves being transmitted from the receptacle antenna, and wherein the receptacle antenna is a conductive print pattern formed on the transmitting board.

9. The inductive charger coupling according to claim 8, wherein the receptacle antenna is arranged in close proximity to the paddle antenna when the paddle is plugged in.

10. The inductive charger coupling according to claim 9, wherein the receptacle antenna, except for a side facing the receiving circuit board, is shielded by conductive patterns formed on the transmitting circuit board.

11. The inductive charger coupling according to claim 10 further including a connecting line made of a conductive pattern formed on the receiving circuit board, wherein the paddle antenna and the receiving circuit are connected by the connecting line.

12. The inductive charger coupling according to claim 8, wherein the transmitting circuit board and the receiving circuit board are waterproof and dust-proof.

13. The inductive charger coupling according to claim 12, wherein the receptacle is installed in a vehicle and the coupling charges the vehicle battery.

\* \* \* \* \*